Feb. 13, 1945.   B. G. CARLSON   2,369,278
GYRO CAGING DEVICE
Filed March 4, 1943   4 Sheets-Sheet 1

INVENTOR.
BERT G. CARLSON.
BY
Frank H. Harmon
ATTORNEY.

Feb. 13, 1945.  B. G. CARLSON  2,369,278
GYRO CAGING DEVICE
Filed March 4, 1943   4 Sheets-Sheet 2

INVENTOR.
BERT G. CARLSON
BY
Frank H. Harmon
ATTORNEY

Feb. 13, 1945.　　　B. G. CARLSON　　　2,369,278
GYRO CAGING DEVICE
Filed March 4, 1943　　　4 Sheets-Sheet 3
Fig. 8.
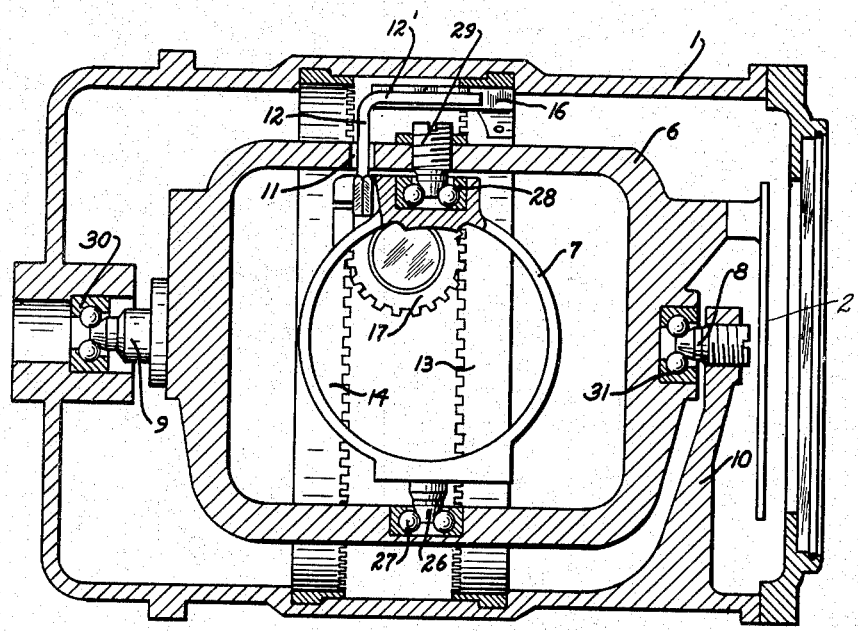
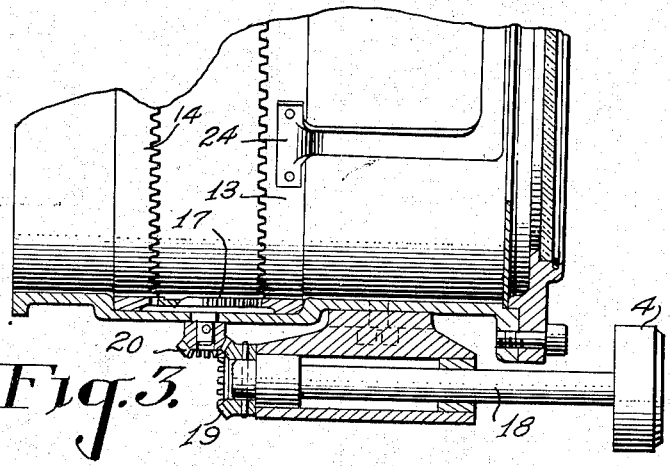
Fig. 3.
INVENTOR.
BERT G. CARLSON
BY Frank A. Harmon
ATTORNEY Feb. 13, 1945. B. G. CARLSON 2,369,278
GYRO CAGING DEVICE
Filed March 4, 1943 4 Sheets-Sheet 4

INVENTOR.
BERT G. CARLSON.
BY
Frank H. Harmon
ATTORNEY.

Patented Feb. 13, 1945

2,369,278

UNITED STATES PATENT OFFICE 2,369,278

GYRO CAGING DEVICE

Bert G. Carlson, Erieside, Ohio, assignor to Jack & Heintz, Inc., Bedford, Ohio, a corporation of Ohio Application March 4, 1943, Serial No. 477,921

2 Claims. (Cl. 116—124)

This invention relates in general to gyro caging devices and has for one of its primary objects to provide a signalling device, operable by the means for caging and uncaging the gyro, that will clearly indicate on the dial that the gyro is caged until it is fully uncaged.

With the foregoing and other objects in view, the invention resides in the combination of parts and in the details of construction hereinafter set forth in the following specification and appended claims, certain embodiments thereof being illustrated in the accompanying drawings, in which:

Figure 3 is an enlarged detail view partly broken away and in longitudinal section through the instrument showing a portion of the caging mechanism.

Figure 8 is a view in longitudinal section taken through the instrument along line 8—8 of Figure 1 showing the gimbal suspension and caging means.

Figure 1:
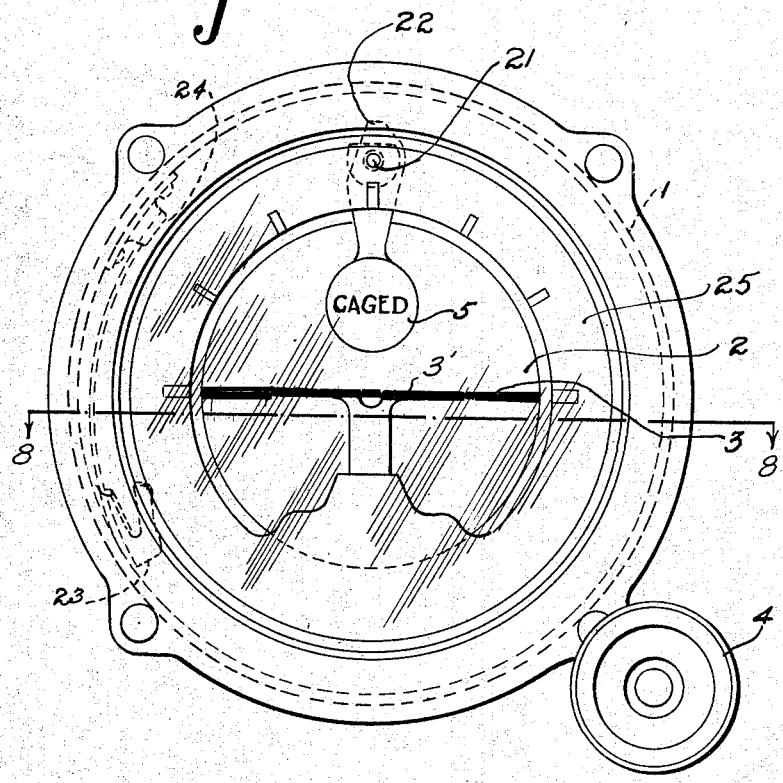
Figure 1 is a view in front elevation, partly broken away, of the dial, showing the signalling device in position indicating caged position of the gyro.
Figure 7:
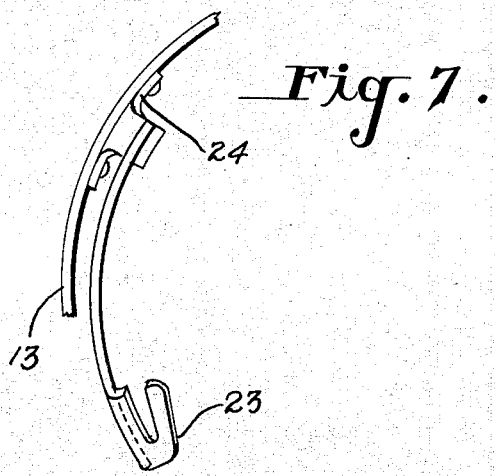
Figure 7 is a view in side elevation of the flag tripping clip.
Figure 6:
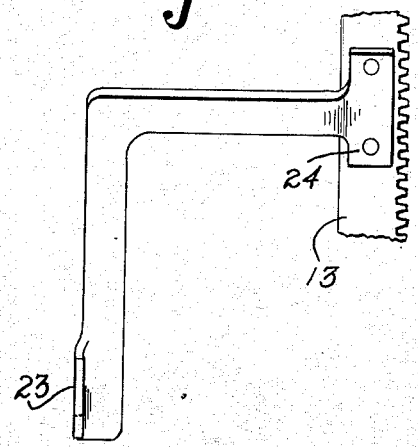
Figure 6 is a view in end elevation of the flag tripping clip.
Figure 2:
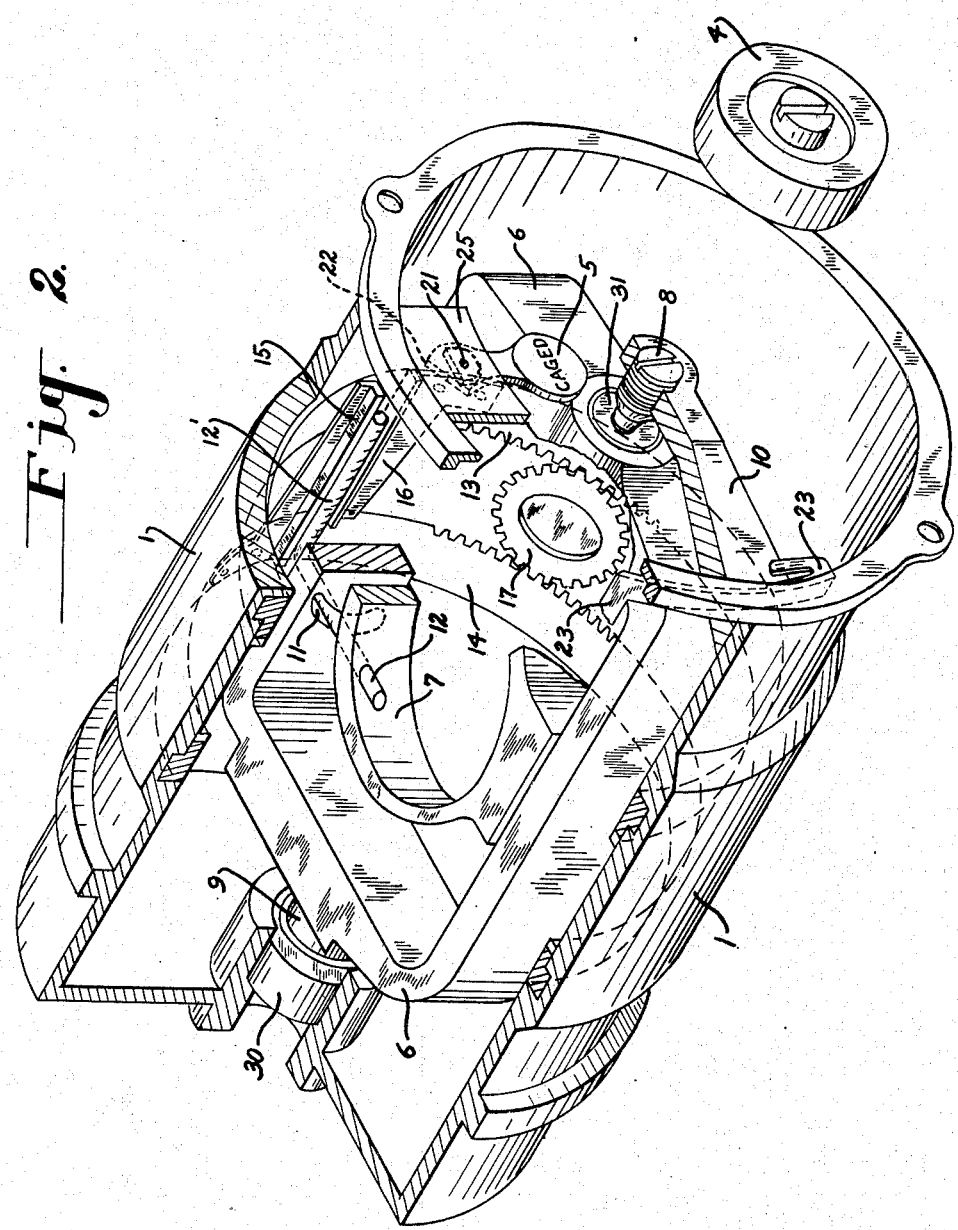
Figure 2 is a view in perspective of a gyro horizon indicator with the dial removed and the top of the casing and part of the gimbal frame assembly broken away, showing a portion of the caging mechanism and a portion of the caging signalling device operating mechanism.

Referring more particularly to the drawings, Figures 1 and 2 show the gyro horizon indicator box 1, its glass covered rotatable dial 2 for indicating bank, the usual artificial horizon bar 3 for indicating pitch, the adjustable miniature airplane 3' and its caging knob 4 and also the improved signalling device in the form of a pivoted and gravity suspended flag 5 swung into position over the face of the dial to signal that the gyro is in caged position.

The horizon gyro indicator and the gyro caging mechanism is of the same construction as disclosed in United States Letters Patent to Bert G. Carlson, No. 2,348,603, dated May 9, 1944, filed January 6, 1943, for Housing and caging unit assembly for gyros, this patent, however, not disclosing a caging indicating device.

The gyro wheel, not shown, is of the conventional vertical spin type and is contained in a housing 7, shown fragmentarily for clarity of illustration of the remainder of the organization. The housing 7 has a trunnion 26 and a bearing assembly 27 to respectively receive a bearing assembly 28 and a trunnion 29 carried by a gimbal frame 6 to permit relative movement between housing 7 and gimbal 6 about an axis defined by trunnions 26 and 29 in their respective bearings 28 and 27, as shown in Figure 8. The gimbal frame 6, in turn, carries a trunnion 9 rotatable in a bearing assembly 30 in the stationary housing 1 and a bearing assembly 31 to receive a trunnion 8 carried by the stationary bracket support 10 of the housing 1 to provide for rotational movement of gimbal frame 6 about an axis defined by trunnions 8 and 9 in their respective bearings 31 and 30, as shown in Figures 2 and 8.

The housing 7 carries an arm 12 riding in an arcuate slot 11 and bent to include an extension 12'. The caging device has two caging ring gears 13 and 14 which are rotatably fitted in suitable grooves in the cylindrical box 1. Secured to gears 13 and 14 are caging arms 15 and 16 for jointly engaging and clamping the extension 12' as shown in Figure 2 to place the gyro in caged position.

The ring gears 13 and 14 are jointly operated in opposite directions by the caging gear 17 into and out of engagement with extension 12' for caging and uncaging of the gyro respectively. This caging gear is operated by turning the caging knob 4 which through its shaft 18 and bevel gears 19 and 20 imparts rotation thereto.

Figure 4:
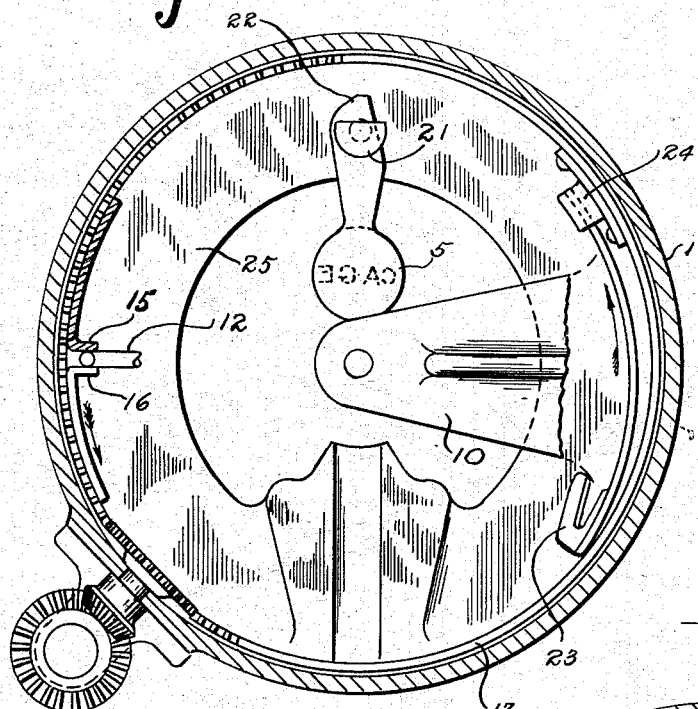
Figure 4 is a view in cross section taken through the instrument, as viewed from the rear, showing the caging signalling device in position to indicate caged position of the gyro.

It has been found in actual practice that pilots have failed to rotate the caging knob to the full extent to cage or uncage the gyro or have inadvertently assumed the gyro to be caged or uncaged when such was not the case. In order to alleviate the possibility of occurrence of such inadvertence there is provided the pendulously mounted signal flag 5 which is pivoted at 21 to the box. Extending upwardly past the pivot 21 the flag is provided with a short bevelled extension 22. The ring gear 13 has secured thereto at 24 a forked bracket 23 which is adapted to engage the extension 22 of the signal flag to swing the same upwardly when the caging knob is rotated to cage the gyro. Figure 4 shows the position of the parts when the gyro is caged. The caging arms 15 and 16 are clamping the extension 12' and the bracket 23 is removed from the flag extension 22. The flag 5 is vertical and visible over the glass covered dial 2 giving full warning to the operator that the gyro is caged.

Figure 5:
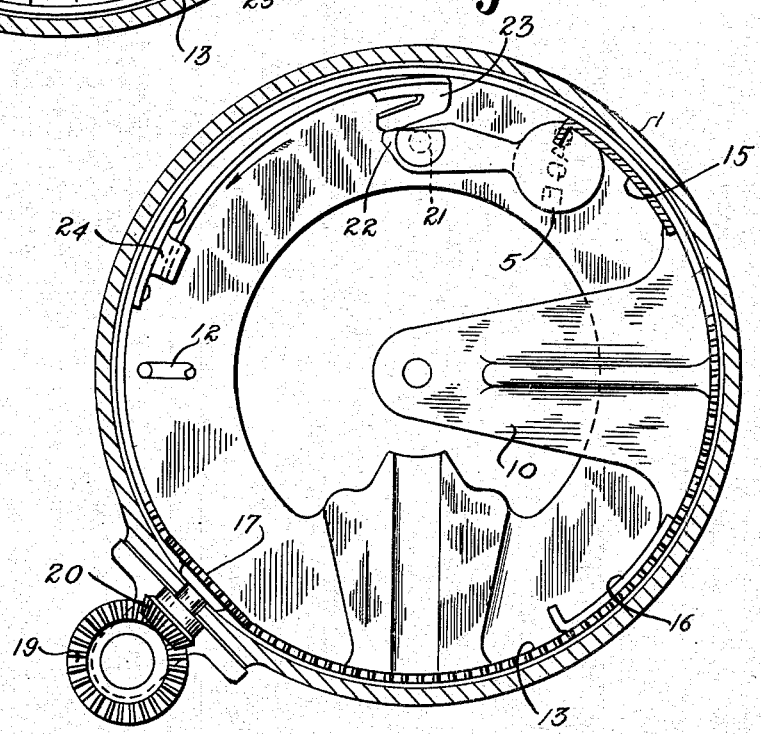
Figure 5 is a view similar to Figure 4, showing uncaged position.

When the caging knob 4 is rotated to uncage the gyro the ring gear 13 is rotated in a counter-clockwise direction, as viewed in Figures 4 and 5, thus bringing the bracket 23 into engagement with the flag extension 22. This rocks the flag about its pivot into a position behind the dial mask 25 and out of sight of the operator and thus he knows that the gyro is uncaged. This is positively true because the movement of the flag is entirely dependent upon the movement of the ring gears and the caging arms carried thereby. In other words, when the caging arms 15 and 16 are clamping the extension 12', the flag is down and visible, as shown in Figure 4. When, however, the flag is moved behind the mask and out of sight by bracket 23, the caging arms, which are also carried by the ring gears 13 and 14, are entirely removed from any engagement with extension 12'.

I claim:

1. In a gyroscopic instrument having a housing, a gyro and gimbal mounting frames therefor for providing freedom of movement about a plurality of axes and means including a pair of jointly and oppositely rotatable gyro caging arm carrying ring gears rotatably mounted in said housing, a member carried by one of said gimbal frames and engageable with the other and adapted to be releasably engaged by said arms for locking said gimbals in place and caging said gyro, an instrument face having a central opening and a mask surrounding the same, a signalling device pivotally connected to the interior of said housing and pendulously suspended thereby behind said mask, means carried by one of said ring gears for moving said signal out of sight behind the mask and arranged at such a point thereon removed from its caging arm for moving said signal out of sight behind the mask only at such predetermined point of travel of said ring gears away from gimbal caging position that the gyro is fully uncaged and for releasing said signal to be pivotally suspended in view through said central opening when said ring gears are in caging position.

2. In a gyroscopic instrument having a housing, a gyro and gimbal mounting frames therefor for providing freedom of movement about a plurality of axes and means including a pair of jointly and oppositely rotatable gyro caging arm carrying ring gears rotatably mounted in said housing, a member carried by one of said gimbal frames and engageable with the other and adapted to be releasably engaged by said arms for locking said gimbals in place and caging said gyro, an instrument face having a central opening and a mask surrounding the same, a signalling device pivotally connected to the interior of said housing and pendulously suspended behind said mask, means carried by one of said ring gears for moving said signal out of sight behind the mask and arranged at such a point thereon removed from its caging arm for moving said signal out of sight behind the mask only at such predetermined point of travel of said ring gears away from gimbal caging position that the gyro is fully uncaged and for releasing said signal to be pivotally suspended in view through said central opening when said ring gears are in caging position, said pivoted signalling device having a signal on one side of its pivot and a tapered extension on the other and a tapered tripping bracket carried by one of said ring gears for releasably engaging the tapered extension of said signal device when in uncaged position and release the same when in caged position.

BERT G. CARLSON.